March 31, 1964 — J. BLOTSKY, JR — 3,126,881
BARBECUE GRILL
Filed Feb. 27, 1963 — 2 Sheets-Sheet 1
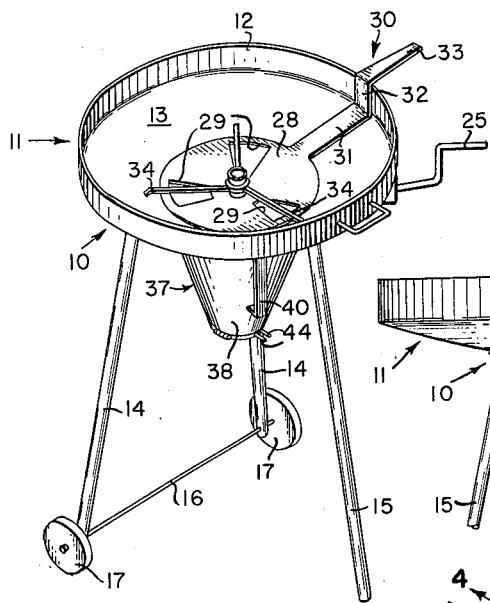
FIG. 1
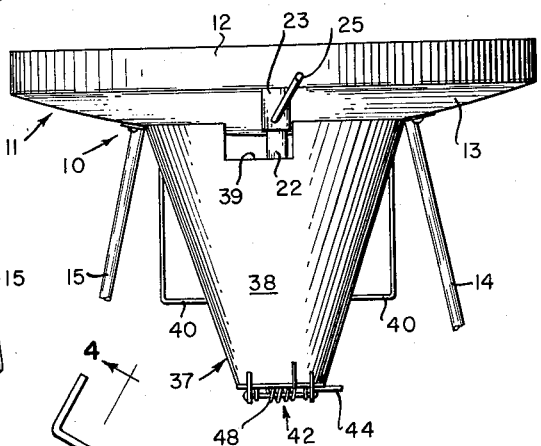
FIG. 3
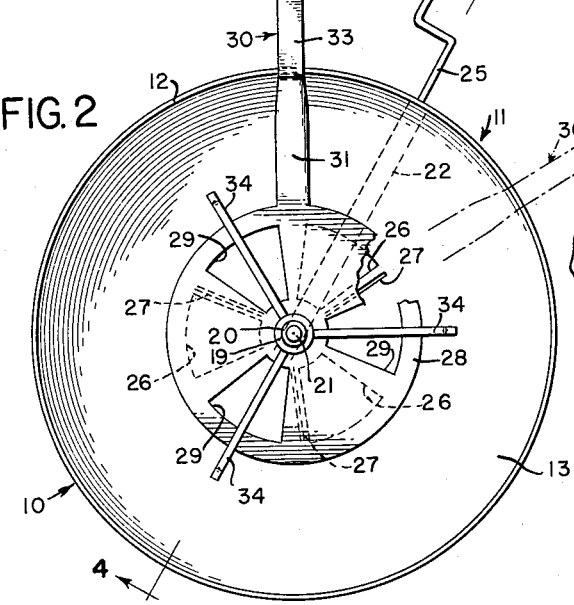
FIG. 2
FIG. 6
INVENTOR
JACOB BLOTSKY, JR
BY Sherman Levy — ATTORNEY March 31, 1964

J. BLOTSKY, JR 3,126,881

BARBECUE GRILL

Filed Feb. 27, 1963

INVENTOR
JACOB BLOTSKY, JR

BY Sherman Levy

ATTORNEY

United States Patent Office 3,126,881
Patented Mar. 31, 1964

3,126,881
BARBECUE GRILL
Jacob Blotsky, Jr., 353 15th Ave. S., Fargo, N. Dak.
Filed Feb. 27, 1963, Ser. No. 261,369
2 Claims. (Cl. 126—25)

This invention relates to a barbecue grill, and more particularly to a barbecue grill for outdoor use which is constructed so that hot charcoal briquettes, coals or the like can be safely and conveniently removed or emptied from the bowl.

The primary object of the present invetion is to provide a barbeque grill wherein the bowl is provided with a plurality of spaced apart openings therein, and wherein the plate-like member is movably mounted within the bowl, the plate-like member having openings therein which are adapted to move into and out of alignment or registry with the openings in the bottom of the bowl so that by properly manually moving or positioning the plate-like member, the coals or fuel can be either retained in the bowl or conveniently and safely emptied therefrom as desired.

A further object is to provide a barbecue grill which provides a simplified method of emptying hot coals therefrom, and wherein the coals or briquettes can be readily collected in a member or the like, and wherein according to the present invention a conical member is arranged contiguous to the bottom of the grill bowl for receiving the coals that drop down through the openings thereabove, and wherein the cone-shaped member has a screen therein for holding the coals so as to permit the ashes to drop through to the bottom, and wherein the bottom of the conical member can be selectively opened to permit convenient discharge of the ashes, the cone-shaped member being detachable so as to permit the coals to be saved, or if desired the coals can be permitted to burn in the cone-shaped member.

Still another object is to provide such a barbecue grill that is economical to manufacture and efficient in operation, and which is rugged in structure and foolproof in use.

These and other objects of the invention will become apparent from a reading of the following specification and claims, together with the accompanying drawing, wherein like parts are referred to and indicated by like reference characters, and wherein:

FIG. 1 is a perspective view of the barbecue grill constructed according to the present invention.

FIG. 2 is an enlarged top plan view, with parts broken away.

FIG. 3 is a fragmentary side elevational view thereof.

FIG. 6 is a fragmentary bottom view illustrating a modification.

Figure 4:
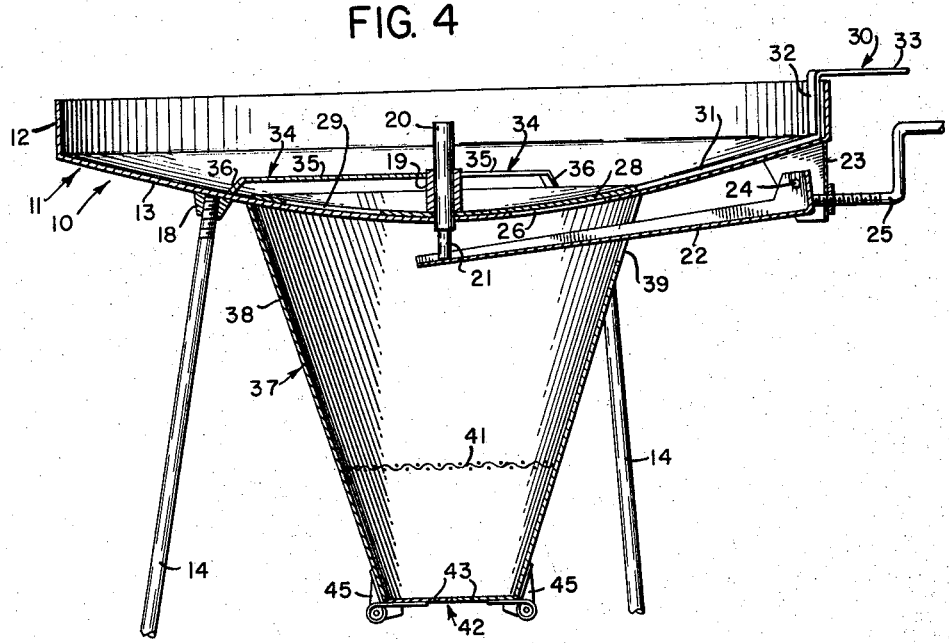
FIG. 4 is an enlarged sectional view taken on the line 4—4 of FIG. 2.

Referring in detail to the drawings, and more particularly to FIGS. 1 through 5 of the drawings, the numeral 10 indicates the barbecue grill of the present invention which is shown to comprise a bowl 11 which includes an upstanding cylindrical side wall 12 and a sloping bottom wall 13, and as shown in FIG. 1 for example the grill 10 may also include supporting legs 14 and 15. The legs 14 may have a horizontally disposed axle 16 connected to the lower ends thereof, and wheels 17 may be provided on the ends of the axle 16. The upper portions of the legs may be connected to the bowl 11 in any suitable manner, as at 18 for example, FIG. 4.

The numeral 19 indicates a vertically disposed bushing which is arranged within the bowl 11, and a sleeve 20 is mounted in the bushing 19, there being a vertically disposed push member 21 slidably engaged in the sleeve 20. The numeral 22 indicates a lever which engages the lower end of the push member 21, and the lever 22 is adapted to be pivotally connected to a frame piece 23 which depends from the bowl 11, and the frame piece 23 may be secured to the bowl in any suitable manner, as for example by welding. The numeral 25 indicates a manually operable crank which is adapted to be manually rotated in order to cause pivotal movement of the lever 22 so that the member 21 can be raised or lowered in order to adjust the grill to a desired height above the bowl 11.

As shown in the drawings the bottom wall 13 of the bowl 11 is provided with a plurality of spaced apart openings 26 therein for a purpose to be later described. The bottom wall 13 is also provided with slots or apertures or perforations 27 contiguous to the openings 26. The numeral 28 indicates a generally circular plate which has a somewhat arcuate formation so as to conform to the sloping configuration of the bottom wall 13 as shown in FIG. 4, and the plate 28 is rotatably or movably arranged contiguous to the upper surface of the bottom wall 13, and the plate 28 has a plurality of spaced apart openings 29 therein, and these openings 29 are mounted for movement into and out of registry or alignment with the openings 26 in the bottom wall 13.

Formed integral with the plate 28 or secured thereto is a handle 30 which is shown to comprise a first portion 31 that is contiguous to the upper surface of the bottom wall 13, and the handle 30 further includes an upstanding portion 32 as well as an end portion 33, FIG. 1.

As shown in the drawings there is provided a plurality of rods 34 which each include end portions 36 that are secured as by welding to the bottom wall 13, and the rods 34 further include horizontally disposed portions 35 that are adapted to be secured to or formed integral with the bushing or fitting 19. The plate 28 is mounted for rotation within the rods 34.

The numeral 37 indicates a frusto-conical body member which is arranged below the bowl 11, and the body member 37 includes a side portion 38 which has a slot or cutout 39 therein for the projection therethrough of the lever 22. The numeral 40 indicates L-shaped bracket elements which are suitably affixed to the body member 37, and the bracket elements 40 define handle pieces. The numeral 41 indicates a horizontally disposed screen-like member which is suitably mounted within the body member 37 as for example as shown in FIG. 4.

Figure 5:
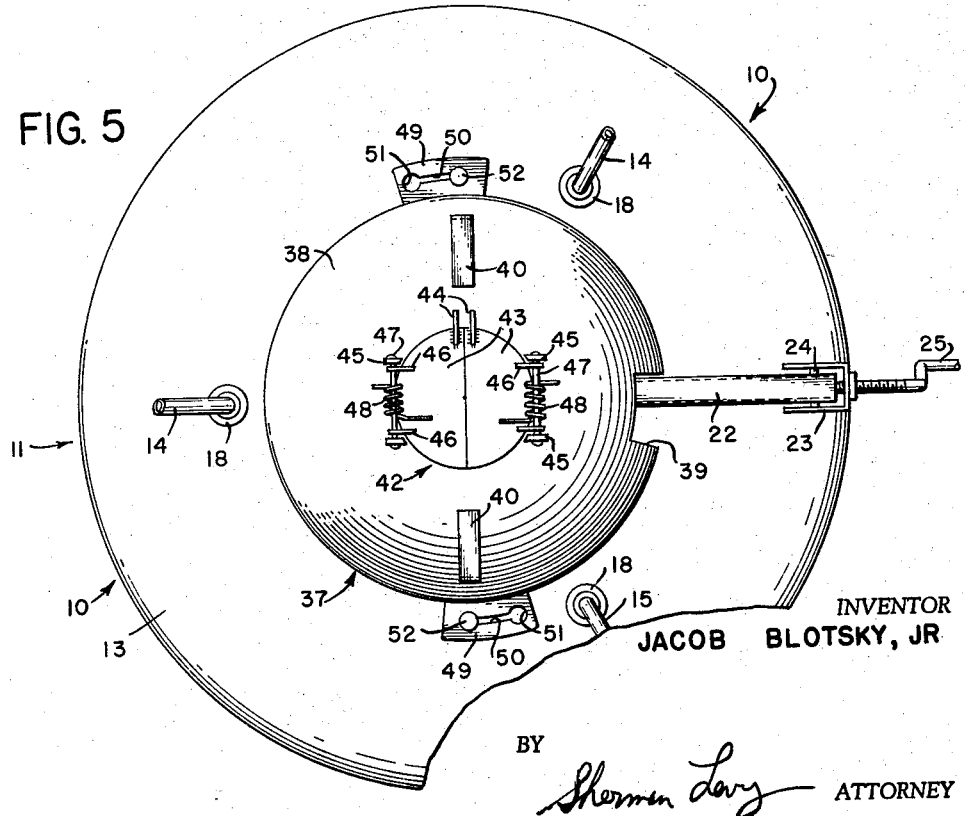
FIG. 5 is an enlarged fragmentary bottom view thereof.

The numeral 42 indicates a bottom of the member 37, and as shown in FIG. 5 for example, the bottom 42 may consist of a pair of normally closed semi-circular base pieces 43 which have lugs 44 secured thereto. The base pieces 43 may be hingedly supported by means of pins 47 which are journaled in lugs 45 that are suitably affixed to the lower end of the body member 37, and ears 46 are adapted to be engaged on the pins 47, and the ears 46 may be suitably secured to the base pieces 43. The numeral 48 indicates spring members which are adapted to be provided for normally urging or biasing the base pieces 43 to their closed position.

The numeral 49 indicates diametrically opposed horizontally disposed flanges which are suitably affixed on the upper portions of the body member 37, and the flanges 49 have slots 50 therein, and the slots 50 include intermediate narrow portions as well as enlarged end portions 51, and the numeral 52 indicates headed pins which are adapted to extend through the slots 50, and the pins 52 are adapted to engage the bottom portion of the bowl 11.

Referring now to FIG. 6 of the drawings, there is illustrated a modification wherein a bottom piece or base piece 53 is adapted to be used in lieu of or instead of the bottom 42, and as shown in FIG. 6 the base piece 53 may include portions 54 which have slots 55 therein, and pins 56 are adapted to extend through the slots 55 and the pins 56 may be suitably affixed to the lower portion of the body member 37.

From the foregoing, it will be seen that there has been provided an improved barbecue grill, and in use with the parts arranged as shown in the drawings, charcoal briquettes, coals or the like are adapted to be arranged in the bowl 11, and the foodstuffs being cooked are adapted to be positioned on the usual wire-like grill piece above the bowl. When foodstuffs are being cooked, the plate 28 is positioned so that the openings 29 are out of registry with the openings 26 in the bottom wall 13, whereby with the briquettes or coals ignited, the foodstuffs can be cooked in the desired manner. When it is desired to empty the bowl 11, as for example after the foodstuffs have been cooked, it is not necessary to tilt or tip over the barbecue grill of the present invention in the usual manner since the briquettes or coals can be readily dispensed or discharged by manually moving the handle 30 and this will cause corresponding movement of the plate 28 whereby the openings 29 can be brought into alignment or registry with the openings 26 so that the briquettes or coals can drop down through the registering openings 29 and 26 and into the body member 37.

The body member 37 is suspended below the bowl 11 by means of the pins 52 which extend through the slots 50, FIG. 5, and due to the provision of the screen 41, the ashes or fine particles can drop down through the screen 41 where the larger particles will be retained on top of the screen 41. When it is desired to empty the body member 37, it is only necessary to open the bottom 42 and this can be readily accomplished by applying finger pressure to the members 44 so that the spring pressure exerted by the springs 48 can be overcome in order to permit the pieces 43 to pivot about axes extending through the pins 47 so that the ashes and the like can be readily discharged from the bottom of the member 37 into a receptacle or the like. When finger pressure on the elements 44 is released, the springs 48 will return the base pieces 43 into their normally closed position as for example as shown in FIGS. 4 and 5. Instead of using a bottom construction 42 as shown in FIGS. 4 and 5, a modified bottom piece or base piece 53 may be used, and the base piece 53 may be provided with portions 54 that have slots 55 therein for the projection therethrough of pins 56 so that in effect the pins 56 and slots 55 provide a bayonet pin type of construction which permits the pieces 53 to be slightly rotated in order to free or disengage the slots 55 from the pins 56 so that the pieces 53 can be separated or disconnected from the lower end of the body member 37 in order to permit emptying of the member 37.

The frustro-conical body member 37 has the flanges 49 integral with or secured to the upper end portions thereof, and the pins 52 extend through the slots 50 and these pins 52 are adapted to be secured in any suitable manner to the bowl 11. Thus, due to the provision of the handle pieces 40, the handle pieces or bracket pieces 40 can be manually gripped in order to slightly rotate the body member 37 and due to the provision of the pins 52 and interengaging slots 50, the member 37 can be rotated slightly in the desired manner.

The crank 25 is adapted to be manually rotated in order to cause pivotal movement of the lever 22 about an axis extending through the pivot pin 24 so that the lever 22 can be pivoted in order to raise or lower the member 21, and the member 21 is adapted to be used for raising and lowering the usual grill member above the bowl wherein such grill member is used for supporting thereon the foodstuffs such as hot dogs, hamburgers or the like which are being cooked, and thus the crank 25 can be used for adjusting the effective or desired height of the grill member so that there is provided a means for controlling the rate or quantity of heat supplied by the briquettes or coals to the foodstuffs.

The parts can be made of any suitable material and in different shapes or sizes.

The upper end portion of the body member 37 is cut away as at 39 to provide clearance for the pivotally mounted lever 22, as for example as shown in FIG. 3.

The handle 30 is constructed so that it includes portions 31, 32 and 33 and this construction insures that the handle 30 will have a snug fit with the adjacent portions of the bowl 11 and the projecting end portion 33 is adapted to be conveniently gripped in order to permit the plate 28 to be manually moved relative to the stationary rods 34 so that the openings 29 can be readily manually moved into and out of registry with the openings 26 in order to control discharge of briquettes and the like down into the body member 37 from the bowl 11.

It will be seen that according to the present invention the bottom of the bowl is provided with cutouts or openings and the plate 28 has similar cutouts or openings and these openings in the plate can be moved into and out of registry or alignment with the openings in the bottom of the bowl by readily moving the handle 30, and by this arrangement the coals can be made to fall into the body member 37 which has the handles 40 connected thereto, and this arrangement greatly simplifies the job of emptying the bowl since it is not necessary to wait until the coals have cooled off and then tipping the entire device over as is usually done.

The holes can be cut or formed in different shapes or sizes and the number thereof can vary as desired or required. Also, the construction of the bottom portion 42 or 53 can be varied as desired or required. With the present invention the job of getting the coals out of the barbecue device is greatly simplified and facilitated and also the job can be done with increased safety.

With the present invention the plate 28 has the plurality of openings 29 therein and the plate 28 rotates so that, for example, after the fire has burned out or served its purpose, the handle 30 can be used to rotate the plate 28 so that the coals will drop down into the conical member 37, and the coal will be held up by the screen 41 and the ashes can drop down through the screen 41 and subsequently the bottom such as the bottom 42 can open up to permit the ashes to be emptied.

In FIG. 2 the numeral 27 indicates small perforations or slots which are adapted to be used for providing air to pass through for a faster flame when the plate or part 28 is moved by the handle 30. In the drawings the holes in the bowl and plate are shown 120° apart but this position or arrangement can be varied as desired. The rods 34 are secured in any suitable manner, as for example, by welding to the bowl bottom wall 13 and to a part such as the part 19, and the plate 28 is placed on the bowl before welding or securing the end portions 36 to the bottom wall 13.

The screen 41 is used to stop the coals and allow passage of ashes therethrough, and the bottom of the member 37 can be opened to dump the ashes down through the open bottom.

The present invention is especially suitable for use with an outdoor barbecue grill since it will eliminate the nuisance or job of tipping over the grill to empty the hot coals when the user is through with the device. Ordinarily the user attempts to lift the hot grill and spill out the coals without getting burned, or sometimes the grill is permitted to remain outside overnight to let the coals burn out and this is dangerous or disadvantageous because some youngster may get too close and get burned, or else it may rain and the soggy mess may result. With the present invention there is provided an easier way for emptying hot coals out of the grill and it will be seen that the round plate or piece of metal 28 with the handle 30 thereon is arranged so that the plate 28 is in the center of the grill, and the plate has the holes 29 therein for coaction with the holes 26 in the bottom of the bowl, and the plate 28 is held in place by means of the three rods 34 welded to the bottom of the bowl. Thus, the grill can be readily emptied by pushing the handle 30 to align the openings or holes 29 with the holes 26, and the rods 34 will serve to push all the coals and ashes into the holes.

Due to the provision of the cone-shaped member 37, the coals can be collected and saved since the coals will drop into the member 37, and the screen 41 which is arranged as shown in FIG. 4 holds the coals while the ashes drop through to the bottom, and a suitable door in the bottom opens to let the ashes be discharged. Also, the cone 37 can be detached so that the coals can be saved, or else the coals can be permitted to burn out in the cone-shaped member 37, and the handle pieces 40 facilitate manual handling of the cone-shaped member 37.

The plate 28 can be arranged so that its openings 29 register with the openings 26 in the bottom wall 13 in order to permit ashes, coals, and the like to drop down through these registering openings. Also, the plate 28 can be moved or arranged so that its openings 29 do not register with either the openings 26 or the slots 27 so that the ashes or coals in the body member 37 can be snuffed out. In addition, the plate 28 can be arranged so that its openings 29 register with the slots 27, as for example when it is desired to supply additional air to the coals in the bowl 11 in order to provide a faster flame. Or, the plate 28 can be arranged so that its openings 29 are out of registry with the openings 26 and slots 27, as for example when coals are being burned in the bowl 11 without the necessity of supplying additional air through the slots 27.

Minor changes in shape, size and rearrangement of details coming within the field of invention claimed may be resorted to in actual practice, if desired.

What is claimed is:

1. A barbecue grill comprising a bowl including an upstanding cylindrical side wall and a sloping bottom wall, legs connected to said bowl and depending therefrom, a vertically disposed bushing in the central portion of said bowl, a frame piece depending from said bowl and affixed thereto, a lever pivotally connected to said frame piece and engaging a vertically slidable member arranged within the bushing, a manually operable crank for moving said lever, said bottom wall having a plurality of spaced apart openings therein, slots in said bottom wall arranged adjacent to the openings therein, a plate of arcuate formation rotatably arranged contiguous to the upper surface of said bottom wall, said bushing being arranged just above the central portion of said plate, and said plate having a plurality of spaced apart openings therein which are mounted for movement into and out of alignment with the openings and slots in said bottom wall, a plurality of rods each including end portions affixed to the upper surfaces of said bottom wall at points spaced from the outer periphery of said plate, and said rods including horizontally disposed portions that are arranged above said plate and which are affixed to said bushing, a handle including a first portion affixed to said plate and said first portion being arranged contiguous to the upper surface of said bottom wall, said handle further including a second portion contiguous to the inner surface of the side wall of the bowl and an outwardly extending third portion, a removable frustro-conical body member arranged below said openings and slots and including a side portion having a slot therein for the projection therethrough of said lever, L-shaped bracket elements affixed to said body member, and a horizontally disposed screen mounted in said body member and said screen being interposed between the top and bottom of the body member.

2. A barbecue grill comprising a bowl including an upstanding cylindrical side wall and a sloping bottom wall, a vertically disposed bushing in the central portion of said bowl, said bottom wall having a plurality of spaced apart openings therein, there being slots in said bottom wall adjacent to said openings, a plate of arcuate formation rotatably arranged contiguous to the upper surface of said bottom wall, the central portion of said plate being arranged contiguous to the lower end of said bushing, and said plate having a plurality of spaced apart openings therein which are mounted for movement into and out of alignment with the openings and slots in said bottom wall, a plurality of rods having ends thereof affixed to the bottom wall of said bowl at points spaced from the outer periphery of said plate and said rods having their opposite ends affixed to said bushing and said rods having portions that are arranged above said plate, a vertical member adapted to slide through said bushing, a handle including a first portion affixed to said plate and said first portion being arranged contiguous to the upper surface of the bottom wall of the bowl, and said handle further including a second portion that is contiguous to the inner surface of the side wall of the bowl, and said handle further including an outwardly extending third portion, a removable frusto-conical body member arranged below said openings and slots and said body member including bracket elements which define hand gripping pieces, a screen in said body member, and said screen being horizontally disposed substantially intermediate the bottom of the bowl and the bottom portion of the body member, and a normally closed bottom portion on the lower end of said body member and said bottom portion including pieces that can be selectively opened to permit discharge of material therethrough.

References Cited in the file of this patent

UNITED STATES PATENTS

| | | |
|---|---|---|
| 744,082 | Lore | Nov. 17, 1903 |
| 1,285,464 | Tarbell | Nov. 19, 1918 |
| 2,120,683 | Simmons | June 14, 1948 |
| 2,484,239 | Moon et al. | Oct. 11, 1949 |
| 2,787,995 | Alter | Apr. 9, 1957 |